(No Model.)
C. H. INMAN.
VEHICLE BRAKE.
No. 585,209. Patented June 29, 1897.
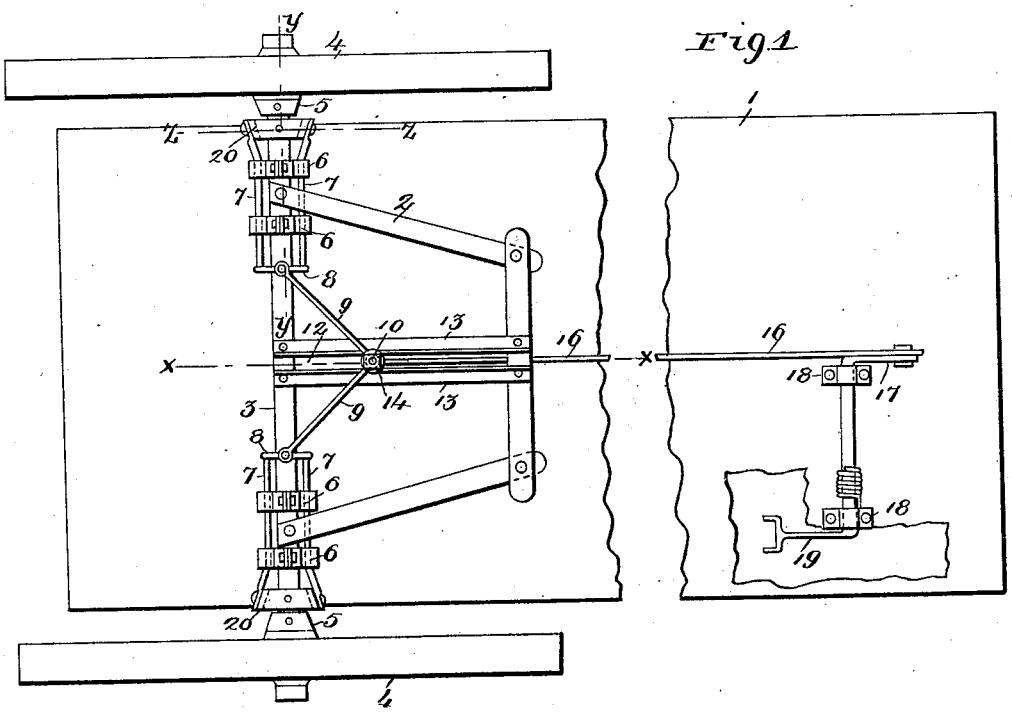
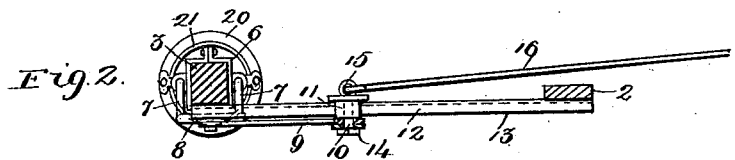
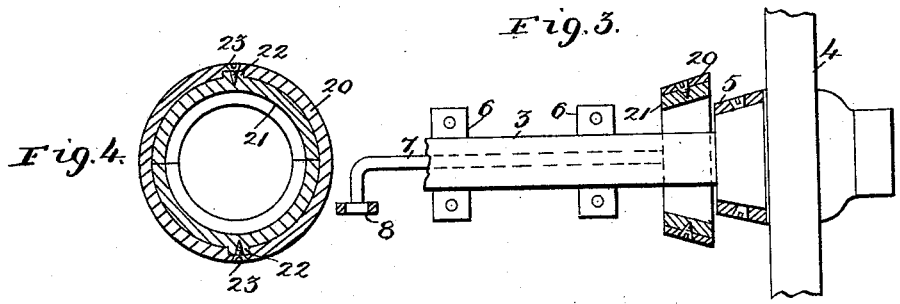
Witnesses
Alfred R. Mathey
Chris Ballett
Inventor
Charles H. Inman.
By his Attorneys
Kellert Starck
THE NORRIS PETERS CO., PHOTO-LITHO., WASHINGTON, D. C.

UNITED STATES PATENT OFFICE.

CHARLES H. INMAN, OF BATCHTOWN, ILLINOIS.

VEHICLE-BRAKE.

SPECIFICATION forming part of Letters Patent No. 585,209, dated June 29, 1897.

Application filed October 14, 1896. Serial No. 608,840. (No model.)

*To all whom it may concern:*

Be it known that I, CHARLES H. INMAN, a citizen of the United States, residing at Batchtown, in the county of Calhoun and State of Illinois, have invented certain new and useful Improvements in Vehicle-Brakes, of which the following is a full, clear, and exact description, reference being had to the accompanying drawings, forming a part hereof.

My invention has relation to improvements in wagon-brakes; and it consists in the novel arrangement and combination of parts more fully set forth in the specification and pointed out in the claims.

In the drawings, Figure 1 is a bottom plan view of a wagon-body with my device attached to the rear truck thereof. Fig. 2 is a section on the line $x\,x$ of Fig. 1. Fig. 3 is a section on the line $y\,y$ of Fig. 1, and Fig. 4 is a section on the line $z\,z$ of Fig. 1.

The object of my invention is to construct a wagon-brake which will act directly on the hub of the wheel, the invention being especially applicable on vehicles provided with pneumatic tires, where it is essential to dispense with the brake-shoes ordinarily applied to the wheel-tire by reason of the danger of abrading and in time tearing such pneumatic tire. The present invention, however, is applicable to vehicles of any and all descriptions.

In detail the invention may be described as follows:

Referring to the drawings, 1 represents an ordinary wagon-body, 2 the rear truck of the same, and 3 the axle of such truck, provided, as usual, with the wheels 4. The inner portion or end of the hub of each wheel is provided with a conical metallic band 5, preferably shrunk on said hub. Disposed on either side of the center of the axle and tightly embracing the same are a series of bands or clamps 6, provided with alining openings for the reception and free passage of suitable reciprocating guide-rods 7, whose inner adjacent ends are deflected downwardly and connected by a transverse U-shaped strip 8, embracing the axle along the bottom thereof. To the base of each U-shaped strip is pivotally connected one end of an operating-link 9, whose opposite end embraces the lower portion of a sliding pin 10, provided with an antifriction-roller 11, adapted to travel in a guideway 12, formed by two parallel bars or plates 13, carried by the rear truck and disposed centrally between the opposite sides of the wagon-body. The links 9 loosely embrace the pin below the guideway, a terminal head 14 retaining them in place on said pin. The part of the pin projecting above the guideway is provided with an eye or loop 15, from which extends forward along the bottom of the wagon-body a rod 16, whose forward end is pivotally connected to the free end of the arm 17 of a spring-controlled double-crank rock-lever mounted to rock in suitable bearings 18 on the under surface of the wagon-body. The opposite arm (pedal-arm) 19 projects upwardly into the wagon-body through an opening in the bottom thereof, the said pedal-lever being located adjacent to the side of the wagon and within easy reach of the driver's foot.

The outer deflected ends of the reciprocating rods 7 carry the conical metallic brake-bands 20, each provided with wooden friction-blocks 21, adapted to frictionally and tightly embrace the bands 5, carried by the hubs. The friction-blocks 21 are preferably made in two sections or halves, each section being provided with a shoulder or ridge 22, adapted to enter a corresponding depression formed along the inner surface of the band 20, when the blocks are finally and firmly secured by the countersunk screws 23. The object of this construction is to prevent turning of the blocks within the bands when the latter are forcibly applied to the bands 5 of the hubs during the travel of the wheels 4.

The operation is obvious from the description. To apply the brakes, the operator or driver simply presses down the pedal-arm 19, tilting the same forward, and at the same time tilting the arm 17 rearward, the latter through the medium of the rod 16 forcing the pin 10 rearwardly within its guideway and causing the members 9 of the toggle-joint formed between the said pin and the links 9 to expand outwardly, forcing the sliding rods 7 outwardly in their bearings and causing the brake-bands carried by their outer ends to simultaneously and frictionally engage the bands 5 of the hubs and thus apply the brakes. Upon release of the pedal-arm 19 the spring controlling the crank-lever, of which said arm forms a part, will return the parts to their normal positions. As is obvious, the brakes in the present device are applied in or move in a plane normally transverse to the plane of rotation of the wheels 4. It is apparent, of course, that many minor changes could be made in the present device without departing from the spirit of my invention. Of course I do not limit myself to any particular material to be used in the construction of the several parts of my device.

The present brake can be applied to carts as well as buggies. It does not endanger the breakage of the body, as it is in no wise attached to the same. It does not gather or carry mud, as it does not contact with the rim of the wheel. It is entirely out of the way of getting in or out of the vehicle. It is light in construction and can be manufactured at little expense.

Having described my invention, what I claim is—

1. In a vehicle-brake, a rear truck, a wagon-body, wheels carried by the said truck, suitable brake-bands surrounding the ends of the axle adjacent to the wheels, depressions formed along the inner surfaces of the bands, means for supporting said brake-bands and guiding the same along the axle, and actuating the same in a direction transverse to the plane of rotation of the wheels, and forcing them frictionally against the adjacent ends of the hubs of the wheels, and suitable friction-blocks carried along the inner surfaces of the brake-bands and having ridges adapted to enter the depressions of the bands, substantially as set forth.

2. In a vehicle-brake, a suitable rear truck, an axle for the same, wheels carried by the axle, brake-bands having suitable friction-blocks embracing the axle at each end, guide-rods to which each brake-band is secured, a U-shaped transverse member connecting the adjacent ends of the guide-rods and partially embracing the axle, a link having one end pivotally secured to the base of each U-shaped member, and the opposite end pivotally secured to a pin guided in a longitudinally-disposed slot or guideway along the wagon-body, a double-crank rocking lever carried by the forward portion of the wagon-body, whereby upon the rocking of the said lever in one direction the links secured respectively to the sliding pin and the guide-rods to which the brake-bands are secured, are caused to expand and drive the brake-bands firmly against the hubs of the adjacent wheels, substantially as set forth.

In testimony whereof I affix my signature in presence of two witnesses.

CHAS. H. INMAN.

Witnesses:
EMIL STAREK,
ALFRED A. MATHEY.